United States Patent [19]

Botros

[11] Patent Number: 6,162,846
[45] Date of Patent: Dec. 19, 2000

[54] WATERFAST DYES FOR MAKING INK JET PERMANENT INKS

[75] Inventor: Raouf Botros, Dayton, Ohio

[73] Assignee: Scitex Digital Printing, Inc., Dayton, Ohio

[21] Appl. No.: 08/354,357

[22] Filed: Dec. 12, 1994

[51] Int. Cl.⁷ ...................................................... C09D 5/00
[52] U.S. Cl. .............................................................. 523/161
[58] Field of Search ............................................... 523/161

[56] References Cited

U.S. PATENT DOCUMENTS 4,035,196   7/1977   Remer ................................. 106/288 Q
5,164,232   11/1992   Henseleit et al. ........................ 427/288

*Primary Examiner*—Edward J. Cain
*Attorney, Agent, or Firm*—Barbara Joan Haushalter

[57] ABSTRACT

An ink jet ink composition comprises a liquid vehicle and a dye modified to attach polymeric chains to the dye. The dye is water soluble and selected from the group consisting of Direct Dyes, Acid Dyes and Food Dyes. The polymer is selected from the group comprising polyethoxylated aromatic amines to enhance affinity of the dye to a cellulosic substrate. The modified dye in this ink jet composition has lower solubility and, therefore, can be used to formulate waterfast inks for ink jet printers.

10 Claims, No Drawings

WATERFAST DYES FOR MAKING INK JET PERMANENT INKS

TECHNICAL FIELD

The present invention relates to aqueous liquid inks which are waterfast when applied and, more particularly, to synthesis of waterfast dyes which can be used in formulating permanent ink jet recording liquids.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability, but waterfast inks are highly desirable for producing permanent images. Decreasing the solubility of the dye increases the waterfastness, and vice versa. It is also known in the industry that a waterfast ink is highly desired for publishing and documentation, to prevent alteration of information on such documents.

One means for improving waterfastness is to use polymers and resins in inks to enhance adhesion of the dye to substrates. However, presence of resins in inks adversely affects machine runnability due to formation of deposits on orifice plates and charge plate buildup.

Ink jet ink compositions are known and generally contain water soluble dyes. Addition of polymeric additives to ink-jet inks, in order to improve permanency, is very well documented in the patent literature. For example, U.S. Pat. No. 5,244,496 teaches the addition of acrylic binder to the ink in order to achieve waterfastness and rub resistance. Another example is U.S. Pat. No. 5,254,158 where Example I described the use of polyethylene oxide/bisphenol polymer as an additive to the ink.

Addition of polymers and resins to inks has only a limited advantage in promoting dye fixation to the fiber. Unless the polymer is somehow attached to the dye molecule by chemical bonding, the polymer alone would cure on the paper leaving the soluble dye to bleed off the paper. In most cases when the interaction between the dye molecule and the polymer is left to some physical forces or weak hydrogen bonding, the waterfastness results are disappointing.

It is seen then that there is a need for improved waterfast dye for use in formulating ink jet permanent inks for ink jet recording equipment.

SUMMARY OF THE INVENTION

This need is met by the waterfast ink composition according to the present invention, wherein the polymer is an integral part of the dye molecular structure. Therefore, when the polymer cures on the surface, it fixes the dye with it and the ink becomes waterfast. The polymer is attached to the dye by coupling the diazotized dye into the polymer. That is, the polymer is used as a coupler instead of the m-phenylenediamine.

Other objects and advantages of the invention will be apparent from the following description and the appended claims.

DETAILED DESCRIPTION OF THE INVENTION

A vital feature in the functioning of an ink jet ink is its ability to change rapidly from a fluid to a solid phase on the surface of a substrate. In the fluid state, the physical and chemical properties of the ink must be such as to give a satisfactory runnability result with regard to the specific ink jet printer. After drying or curing, the solid ink film has to be capable of acquiring certain permanency demands imposed by the end user. The events that occur during the drying of an ink may involve simple physical changes or those in which new chemical bonds are formed. The term "cure" is generally reserved for the latter situation. A chemical cure may be initiated when the resin in the ink is activated by one of several radiation energies, such as microwave, infrared, ultraviolet, or electron beam. The activated may start a rapid chain reaction which quickly converts the fluid ink into a dense, high cross-linked solid.

In accordance with the present invention, a dye structure is modified to attach polymeric chains to the dye molecule. The polymer is selected from the group comprising polyethoxylated aromatic amines to enhance affinity of the dye to the cellulosic substrate. An example of this invention can be illustrated with DB-19 which has the following structure:

DB-19

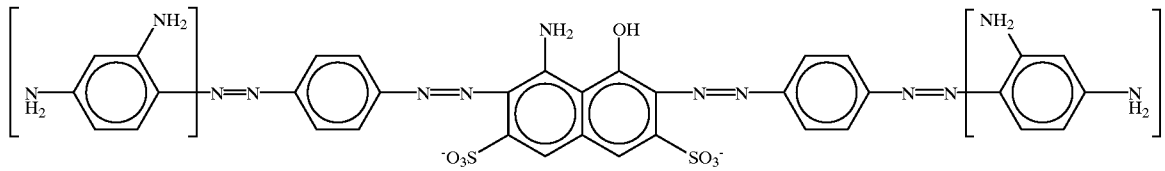

In the last step of the synthesis, instead of coupling into m-phenylenediamine (bracketed in the structure), a polyethylene oxide/m-toluidine polymer of the following structure is used:

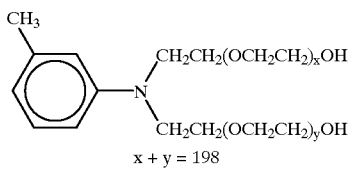

$x + y = 198$

The polymer is commercially available from Henkel Corporation under the product name POE (100) m-toluidine, 50%. In accordance with the present invention, the amount of polymer used in the synthesis can be adjusted to obtain the optimum waterfastness. Therefore, it may be necessary to replace only one m-phenylenediamine molecule, both m-phenylenediamine molecules, or any degree of substitution in between.

An additional advantage of using the polyethylene oxide/m-toluidine polymer is the ability of the polyethylene chains to attach itself to the cellulosic hydroxy groups in the substrate, thus promoting additional adhesion to the paper.

As will be obvious to those skilled in the art, the example of DB-19 is intended to be illustrative only, and not limiting, since the invention can be applied to all azo dyes of all colors.

The ink jet ink composition of the present invention comprises a liquid vehicle and a dye, where the dye is modified according to the present invention.

The liquid vehicle in the ink jet ink composition of the present invention comprises an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as an alkanolamine; and a wetting agent of from 0 to 1 wt. %, such as an ethoxylated glycol ether; and a lower alphatic alcohol having one hydroxy group and up to five carbon atoms in a straight or branched chain in an amount of 0 to 10 wt. %; and a biocide from 0 to 0.5 wt. % such as dehydroacetic acid. The ink may also include an optional defoamer such as phosphate esters, silicone or non-silicone defoamer or acetylenic diol.

The dye in the ink jet ink composition of the present invention is water soluble and preferably selected from the group consisting of Direct Dyes, Acid Dyes and Food Dyes. In general, the concentration of the dye should be between about 2% and 4% by weight.

An ink made with the waterfast dye of the present invention may be manufactured as follows:

PREPARATION OF INK

EXAMPLE

The following is one embodiment of an ink prepared in accordance with the present invention.

| Component | Weight % |
| --- | --- |
| Modified DB-19 | 2 |
| Triethanolamine | 1 |
| Surfynol 104E Wetting Agent | 0.5 |
| 1,2-Bnzisothiazoline-3-one biocide | 0.1 |
| Deionized water | Balance |

When the ink composition was formulated as above in accordance with the present invention, the ink was used in a continuous ink jet printer, such as the type manufactured by Scitex Digital Printing, Inc., in Dayton, Ohio, to test its waterfastness. The prints generated using the ink formulated in accordance herewith retained nearly 100% of optical density, with no bleed after soaking in water for one minute.

As will be obvious to anyone skilled in the art, the ingredients in the examples above are commercially available. It is also understood and known in the art that waterfastness is dye specific, resulting in variations in the amount of waterfastness achieved. The ink composition of the present invention is particularly adaptable for incorporation into an ink jet printing apparatus for forming images by causing the ink to be expelled in droplets onto a substrate, thereby generating an image on the substrate.

Since the modified dyes may have some solubility in alcohol, a small percentage of alcohol can be added to aqueous inks to improve drying time.

INDUSTRIAL APPLICABILITY AND ADVANTAGES

The present invention is useful in the field of ink jet printing, and has the advantage of formulating a modified dye for use in ink jet printing ink which has decreased solubility and increased waterfastness.

The invention has been described in detail with particular reference to certain preferred embodiments thereof, but it will be understood that modifications and variations can be effected within the spirit and scope of the invention.

What is claimed is:

1. An ink jet ink composition comprising a liquid vehicle, a dye having a molecular structure, and a polyethoxylated aromatic amine polymer to enhance affinity of the dye to a cellulosic substrate, wherein the polymer is an integral part of the dye molecular structure.

2. An ink jet ink composition as claimed in claim 1 wherein the liquid vehicle comprises an amine.

3. An ink jet ink composition as claimed in claim 2 wherein the liquid vehicle comprises alkyl- and alkanol-substituted amines.

4. An ink jet composition as claimed in claim 1 wherein the liquid vehicle is selected from the group consisting of a wetting agent, a biocide, denatured alcohol, deionized water, and mixtures thereof.

5. An ink jet composition as claimed in claim 1 wherein the liquid vehicle is selected from the group consisting of a wetting agent, a biocide, denatured alcohol, deionized water, a corrosion inhibitor, a lower alphatic alcohol, and mixtures thereof.

6. An ink jet composition as claimed in claim 1 further comprising a defoamer.

7. An ink jet ink composition as claimed in claim 1 wherein the dye is water soluble and selected from the group consisting of Direct Dyes, Acid Dyes and Food Dyes.

8. A process for generating images which comprises incorporating into an ink jet printing apparatus the ink composition of claim 1 and forming images by causing the ink to be expelled in droplets onto a substrate, thereby generating an image on the substrate.

9. A process as claimed in claim 8 wherein the dye is water soluble and selected from the group consisting of Direct Dyes, Acid Dyes and Food Dyes.

10. A process as claimed in claim 8 wherein the image is generated by a continuous stream ink jet printing process.

* * * * *